United States Patent
Funakoshi

(10) Patent No.: US 11,979,678 B2
(45) Date of Patent: May 7, 2024

(54) SOUND PROCESSING APPARATUS, SOUND PROCESSING METHOD, AND STORAGE MEDIUM

(71) Applicant: CANON KABUSHIKI KAISHA, Tokyo (JP)

(72) Inventor: Masanobu Funakoshi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 17/511,120

(22) Filed: Oct. 26, 2021

(65) Prior Publication Data

US 2022/0150384 A1    May 12, 2022

(30) Foreign Application Priority Data

Nov. 11, 2020  (JP) .................................. 2020-187987

(51) Int. Cl.
*H04N 5/04* (2006.01)
*H04N 21/43* (2011.01)

(52) U.S. Cl.
CPC ........... *H04N 5/04* (2013.01); *H04N 21/4302* (2013.01)

(58) Field of Classification Search
USPC ........................................................ 348/515
See application file for complete search history.

(56) References Cited

U.S. PATENT DOCUMENTS

| | | | | |
|---|---|---|---|---|
| 8,634,697 B2 * | 1/2014 | Ohbitsu | ............ | H04N 21/4396 386/239 |
| 9,674,562 B1 * | 6/2017 | Spracklen | ............ | H04N 21/233 |
| 10,671,251 B2 * | 6/2020 | German | ................ | G06F 3/0483 |
| 2002/0101368 A1 * | 8/2002 | Choi | ....................... | G10L 21/04 704/E21.017 |
| 2004/0001694 A1 * | 1/2004 | Evans | .................. | G11B 27/034 386/E5.052 |
| 2006/0031556 A1 * | 2/2006 | Evans | ................ | H04N 21/4143 375/E7.278 |
| 2007/0180466 A1 * | 8/2007 | Ando | ............... | H04N 21/42646 348/E5.007 |
| 2011/0033172 A1 * | 2/2011 | Ando | ..................... | H04N 5/775 386/355 |
| 2017/0004858 A1 * | 1/2017 | Ngiam | ................ | G10L 21/0356 |
| 2022/0303641 A1 * | 9/2022 | Kiyama | ............ | H04N 21/4345 |

FOREIGN PATENT DOCUMENTS

| | | | |
|---|---|---|---|
| JP | 2005303816 A | 10/2005 | |
| JP | 2007110749 A | 4/2007 | |

\* cited by examiner

*Primary Examiner* — John W Miller
*Assistant Examiner* — Sean N. Haiem
(74) *Attorney, Agent, or Firm* — CANON U.S.A., INC. IP Division

(57) ABSTRACT

A sound processing apparatus includes a reception unit configured to receive information including a timecode and a playback speed of video data, an acquisition unit configured to acquire, from a storage unit configured to store a sound signal, sample data obtained by dividing the sound signal, the sample data corresponding to the timecode included in the information received by the reception unit, and an output unit configured to output data obtained by associating the playback speed included in the information received by the reception unit with the sample data acquired by the acquisition unit.

11 Claims, 13 Drawing Sheets

FIG.2

| FRAME SEQUENCE NUMBER |
|---|
| TIMECODE |
| VIRTUAL CAMERA ORIENTATION |
| VIRTUAL CAMERA FIELD ANGLE |
| VIRTUAL CAMERA COORDINATES |
| PLAYBACK SPEED |

SOUND PROCESSING APPARATUS, SOUND PROCESSING METHOD, AND STORAGE MEDIUM

BACKGROUND

Field

The present disclosure relates to a technique for generating a sound signal.

Description of the Related Art

A technique is known for synchronizing a video image with sound so that the content of the video image matches the timing of outputting sound when the sound is added to the video image to be played back. Japanese Patent Application Laid-Open No. 2007-110749 discusses a technique for a video/sound processing apparatus in which an input unit outputs a set of video data, sound data, and the time when these pieces of data are input to each processing unit in response to a request from each processing unit for processing video or sound data, thereby synchronizing a video image with sound.

In a system for synchronizing a video image with sound, it may be desirable to change the playback speed of sound to match the playback speed of the video image if the playback speed of the video image varies. However, the method discussed in Japanese Patent Application Laid-Open No. 2007-110749 may have a difficulty to acquire the accurate time of a sound signal depending on variations in the playback speed of the video image. This may cause deterioration in the accuracy of synchronization between the video image and the sound.

SUMMARY

A sound processing apparatus includes a reception unit configured to receive information including a timecode and a playback speed of video data, an acquisition unit configured to acquire, from a storage unit configured to store a sound signal, sample data obtained by dividing the sound signal, the sample data corresponding to the timecode included in the information received by the reception unit, and an output unit configured to output data obtained by associating the playback speed included in the information received by the reception unit with the sample data acquired by the acquisition unit.

Further features of the present disclosure will become apparent from the following description of exemplary embodiments with reference to the attached drawings.

BRIEF DESCRIPTION OF THE DRAWINGS

FIG. 2 illustrates a data structure of virtual camera information.

DESCRIPTION OF THE EMBODIMENTS

Figure 1:
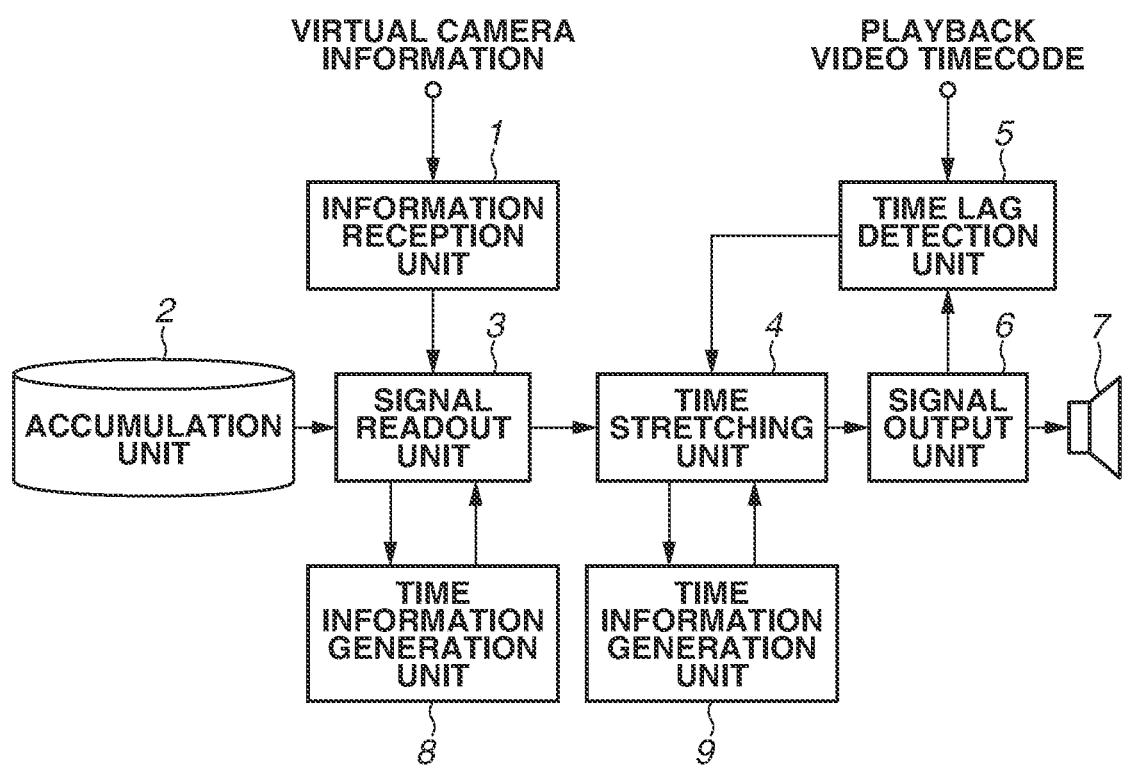
FIG. 1 illustrates a configuration example of a sound processing apparatus according to one or more aspects of the present disclosure.

Exemplary embodiments of the present disclosure will be described in detail below with reference to the accompanying drawings. Configurations described in the following exemplary embodiments are merely examples, and the present disclosure is not limited to the illustrated configurations. In the following exemplary embodiments, the same components or processes are denoted by the same reference numerals.

An exemplary embodiment of the present disclosure illustrates a configuration in which sound is added to a free viewpoint video image obtained by arranging a virtual camera in a virtual space constructed by, for example, a computer graphics (CG) object. The free viewpoint video image according to the present exemplary embodiment is also referred to as a virtual viewpoint video image. The virtual viewpoint video image is generated by designating, for example, the position, and orientation of the virtual camera manually by a user or automatically by an apparatus. In the present exemplary embodiment, a sound signal to be added to the free viewpoint video image is referred to as free viewpoint sound.

Matters that should be taken into consideration when a video image and sound are synchronized will now be described prior to describing a sound processing apparatus according to the present exemplary embodiment.

To generate sound that matches a video image in a system for generating the free viewpoint sound, it may be desirable to recognize not only time information about a video signal, but also time information about a sound signal on which various processes are performed. For example, in the case of performing a process of changing, for example, a sound image localization direction or a sound field direction depending on the coordinates of the position of the virtual camera, it may be desirable to acquire the coordinates of the virtual camera that match the time of the sound signal to be processed. Further, a difference between processes to be performed on a video signal and a sound signal, respectively, causes a difference in the amount of processing delay. It may therefore be desirable to recognize the time of the video signal to be played back and the time of the sound signal to be played back, in the case of playing back a video image and sound in a synchronized manner. In other words, it may be desirable to acquire the time of the sound signal when each process is performed on the sound signal. To play back the sound in synchronization with the video image to be played back, it may be desirable to change the playback speed of the sound by accurately recognizing the times of both the video signal and the sound signal.

In general, a time stretching process based on a resampling process is performed as a process for the sound signal to change the playback speed. However, when the resampling process is performed, the time length of the sound signal obtained as a result of the process with respect to one sample varies. In the technique discussed in Japanese Patent Application Laid-Open No. 2007-110749, only the playback at a constant speed is taken into consideration. If the playback speed fluctuates over time, the time length of the sound signal with respect to one sample varies. Thus, the accurate time for data obtained after the playback speed is changed cannot be calculated based only on the transmitted time information. Furthermore, a playback speed instruction is issued for each video image frame in most video/sound systems, and thus the playback speed cannot match the sample length of the resampling process in some cases. If any segment (sample data) that is a delimiter of a sound signal is extracted from the sound signal obtained after the time stretching process in a subsequent process, various types of sample data with different time lengths therefore coexist. For the reasons described above, the accurate time of the sound signal cannot be acquired by using the related art technique described above, if the playback speed varies from moment to moment in a system for synchronizing a video image with sound.

The sound processing apparatus according to the present exemplary embodiment adds time information in a table including a plurality of elements as a pair of time and a playback speed (the table is hereinafter referred to as a time information table) to a segment of a sound signal, thereby making it possible to recognize the accurate time of the sound signal to be processed. Configuration and process examples of the sound processing apparatus according to the present exemplary embodiment will be described in detail below.

First Exemplary Embodiment

FIG. 1 illustrates a functional configuration example of a sound processing apparatus according to a first exemplary embodiment. An information reception unit 1 illustrated in FIG. 1 sequentially receives (acquires) virtual camera information generated by, for example, an information processing apparatus (not illustrated), extracts a timecode of a video image from the virtual camera information, and outputs the timecode to a signal readout unit 3. In the present exemplary embodiment, the virtual camera information is data including various information corresponding to frames of a video image on one-to-one basis. The video image is obtained by virtually capturing an image with a virtual camera.

FIG. 2 illustrates an example of a detailed data structure of the virtual camera information according to the present exemplary embodiment. As illustrated in FIG. 2, the virtual camera information includes a frame sequence number, a timecode, a virtual camera orientation, a virtual camera field angle, virtual camera coordinates, and a playback speed. In the virtual camera information, the frame sequence number is information for designating the number indicating the order of each video image frame. The timecode is information indicating the time of the virtual camera information. The virtual camera orientation is information indicating the orientation of the virtual camera in one frame. The virtual camera field angle is information indicating the field angle of the virtual camera in one frame. The virtual camera coordinates are information indicating the coordinates of the virtual camera in one frame. The playback speed is information indicating the speed at which the frames of the video image are played back. In the present exemplary embodiment, the frame sequence number and the timecode are treated as different items so that another camera information with a different virtual camera orientation, a different field angle, and different coordinates can be treated as another frame even when the camera information includes the same timecode. With this configuration, a video image and sound can be generated and played back by changing the state of the virtual camera, for example, when the video image and sound are repeatedly played back or played back again by returning the playback time.

Referring back to FIG. 1, an accumulation unit 2 stores data (as sound signal data) obtained by adding information indicating the time of a first sample to the sound signal fragmented into segments with a default time length. In the present exemplary embodiment, the sound signal is composed of a plurality of channels and the accumulation unit 2 stores all the sound signal channels for the same time interval as one piece of data. The data may be stored as separate pieces of data for each channel, and any configuration can be applied without departing from the scope of the present disclosure.

The signal readout unit 3 searches for and reads out, from the accumulation unit 2, the sound signal at the time corresponding to the timecode extracted from the virtual camera information by the information reception unit 1, and stores the read sound signal in an output buffer included in the signal readout unit 3. The signal readout unit 3 outputs, to a time information generation unit 8, information including a pair of the time of the sound signal and the playback speed stored in the output buffer included in the signal readout unit 3.

Figure 3:
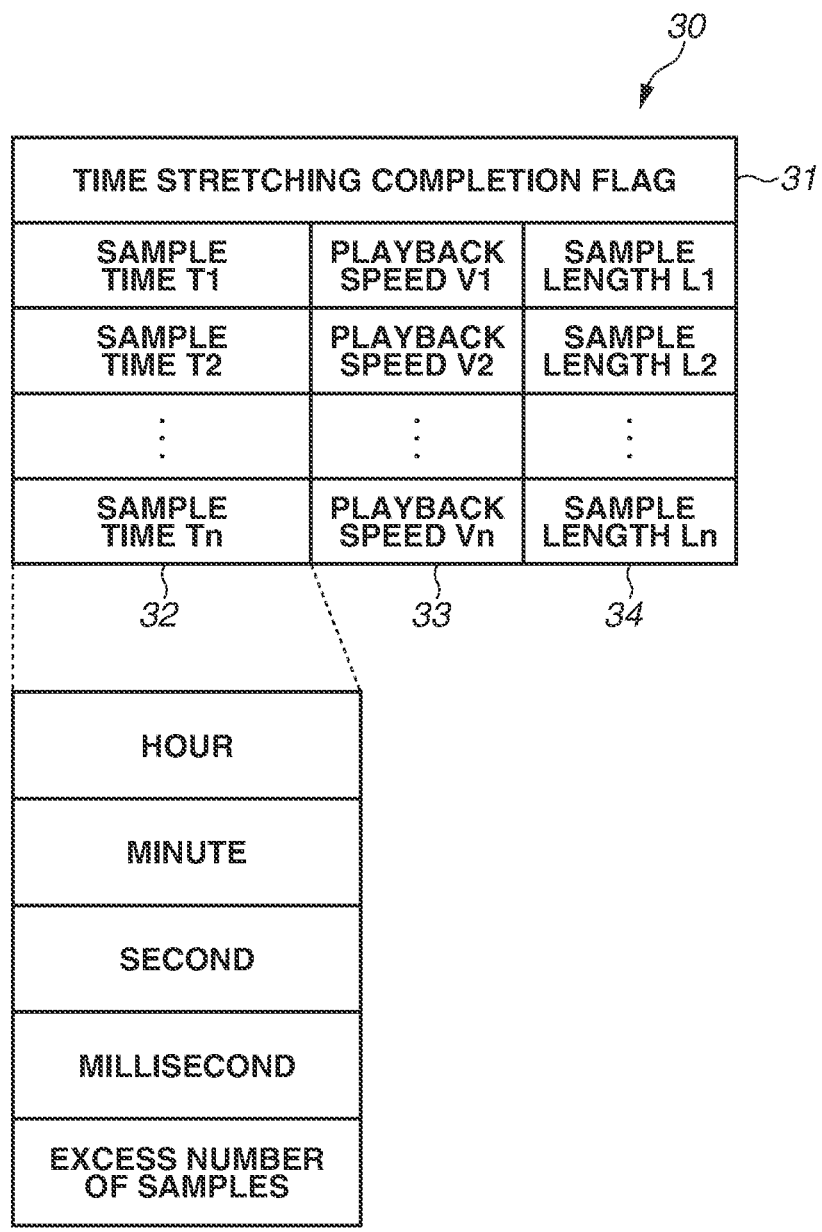
FIG. 3 illustrates a data structure of a time information table.

The time information generation unit 8 generates the time information table described below based on the information obtained from the signal readout unit 3, and outputs the time information table to the signal readout unit 3. The signal readout unit 3 outputs the obtained time information table as well as the sound signal stored in the output buffer included in the signal readout unit 3 to a time stretching unit 4. In the present exemplary embodiment, the time information table is data in a table including the components of the sound processing apparatus and time-related information about the sound signal to be processed. FIG. 3 illustrates a configuration example of a time information table 30. The time information table 30 is a table configured to store a plurality of elements as a set of three elements, i.e., one flag (time stretching completion flag 31) indicating the state of data in the time information table 30, sample time 32, a playback speed 33, and a sample length 34.

The time stretching completion flag 31 is a flag indicating whether the sample time included in the time information table 30 is before or after a time stretching process described below. If the sample time is before the time stretching process, the time stretching completion flag 31 is turned off (e.g., "0"). In contrast, if the sample time is after the time stretching process, the time stretching completion flag 31 is turned on (e.g., "1"). In the present exemplary embodiment, the time stretching process based on the resampling processing is performed as described above. The time length per sample therefore varies between before and after the time stretching process. For example, assume that the time stretch process is performed with default settings in which the sampling rate of the sound signal is fs[Hz] and the playback speed scale factor is 2.0 in the sound processing apparatus according to the present exemplary embodiment. In this case, the time length per sample is 1/fs[sec] before the time stretching process and is 2.0/fs[sec] after the time stretching process. In the present exemplary embodiment, the time stretching completion flag 31 is information for identifying this state. It may be desirable to change the time calculation method by turning on or off the time stretching completion flag 31.

The sample time 32 is the time of the first sample in a segment of the sound signal. Each sample time 32 includes hour, minute, second, millisecond, and the excess number of samples. In the sample time 32, hour, minute, and second are stored as values similar to the normal time. Millisecond is stored as an integer in units of milliseconds. The excess number of samples is a value indicating the time on the order of milliseconds or less as the number of samples. For example, if the playback speed of the sound signal at a sampling rate of 48 kHz is 1.0, integer values ranging from 0 to 47 are stored as values indicating the excess number of samples.

The playback speed 33 indicates the playback speed scale factor designated in a segment of the sound signal. For example, 1.0 is stored in the playback speed 33 in a normal playback operation, and 2.0 is stored in the playback speed 33 in a double-speed playback operation.

The sample length 34 is a sample length per channel in a segment of the sound signal.

Referring again to FIG. 1, the time stretching unit 4 performs the time stretching process on the sound signal output from the signal readout unit 3. As described in detail below, in the present exemplary embodiment, the time stretching unit 4 performs the time stretching process on the sound signal based on the time information table output from the signal readout unit 3 and a time lag amount output from a time lag detection unit 5 described below. The time stretching unit 4 stores the sound signal obtained after the time stretching process in an output buffer included in the time stretching unit 4. The time stretching unit 4 outputs, to a time information generation unit 9, information indicating a pair of the time of the sound signal and the playback speed stored in the output buffer included in the time stretching unit 4.

The time information generation unit 9 generates (reconfigures) the time information table based on the information obtained from the time stretching unit 4, and outputs the generated time information table to the time stretching unit 4. The time stretching unit 4 outputs the obtained time information table to a signal output unit 6 together with the sound signal that is stored in the output buffer included in the time stretching unit 4 and is obtained after the time stretching process.

The signal output unit 6 converts a digital sound signal output from the time stretching unit 4 into an analog sound signal, amplifies the analog sound signal, as needed, and outputs the amplified signal to a speaker 7. The signal output unit 6 also calculates the playback sound time based on the time information table obtained from the time stretching unit 4, and outputs the playback sound time information to the time lag detection unit 5. The playback sound time information is information indicating the time of sound to be output to the speaker 7 from the signal output unit 6.

The time lag detection unit 5 receives a playback video timecode from, for example, the information processing apparatus (not illustrated), compares the time information corresponding to the playback video timecode with the playback sound time information obtained from the signal output unit 6, and detects the time lag amount. The time lag detection unit 5 then outputs information indicating the detected time lag amount as a control signal to the time stretching unit 4. The time stretching unit 4 can thereby perform the time stretching process on the sound signal based on the time information table output from the signal readout unit 3 and the control signal depending on the time lag amount output from the time lag detection unit 5, as described above.

The speaker 7 converts the analog sound signal output from the signal output unit 6 into sound and outputs the sound.

Figure 4:
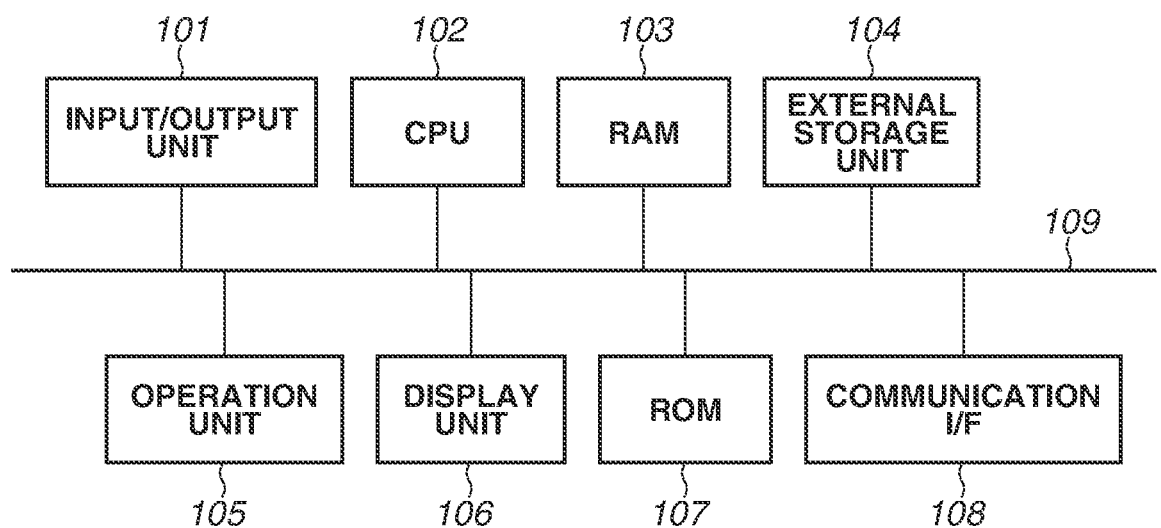
FIG. 4 illustrates a hardware configuration of the sound processing apparatus.

FIG. 4 illustrates a hardware configuration example for carrying out the functional configuration of the sound processing apparatus illustrated in FIG. 1 as a software program. An input/output unit 101 illustrated in FIG. 4 receives an input of the virtual camera information and the playback video timecode from an external apparatus, such as the information processing apparatus (not illustrated), and delivers the virtual camera information and the playback video timecode to other components, as needed, in response to an instruction from a central processing unit (CPU) 102 via a bus 109.

The CPU 102 reads out a program from a read-only memory (ROM) 107 or an external storage unit 104, loads the program on a random access memory (RAM) 103, and executes the program to thereby control the other components via the bus 109. The CPU 102 also performs various calculations by reading or writing data from or to the RAM 103, as needed. In the present exemplary embodiment, the CPU 102 executes a sound processing program, thereby implementing each function and each process of the sound processing apparatus illustrated in FIG. 1. The sound processing apparatus includes one or more dedicated hardware modules different from the CPU 102. At least some of the processes to be executed by the CPU 102 may be executed by dedicated hardware modules. Examples of the dedicated hardware modules include an application specific integrated circuit (ASIC), a field programmable gate array (FPGA), and a digital signal processor (DSP).

The external storage unit 104 is composed of, for example, a hard disk drive or a solid-state drive. The external storage unit 104 stores the sound processing program according to the present exemplary embodiment and data to be accumulated for a long period of time. The function of the accumulation unit 2 illustrated in FIG. 1 is also implemented by the external storage unit 104.

The ROM 107 stores, for example, fixed parameters and fixed programs that need not be changed. Examples of the fixed parameters include a program for starting or terminating the hardware device, and a basic input/output control program. The ROM 107 is accessed from the CPU 102, as needed. The sound processing program according to the present exemplary embodiment may be stored in the ROM 107.

The RAM 103 temporarily stores programs and data supplied from the ROM 107 and the external storage unit 104 and data supplied from an external apparatus via a communication interface (I/F) 108. The RAM 103 also temporarily stores, for example, a part of a program being executed, accompanying data, calculation results from the CPU 102.

An operation unit 105 receives various instruction operations from the user, converts the instruction operations into operation signals, and transmits the operation signals to the CPU 102 via the bus 109. The operation unit 105 is composed of, for example, a keyboard, a mouse, a joystick, and a touch panel. The CPU 102 controls the program being executed and issues a control instruction for the other components according to the operation signals from the operation unit 105.

A display unit 106 displays the state of the program that is being executed and the output of the program for the user.

The display unit 106 includes, for example, a liquid crystal display and a light-emitting diode (LED), and displays, for example, a graphical user interface (GUI) used for the user to operate the sound processing apparatus.

The communication I/F 108 is an interface for performing a data input/output process on a communication network such as the Internet. If the sound processing apparatus is connected to an external apparatus with a wire, a communication cable is connected to the communication I/F 108. If the sound processing apparatus includes a function for establishing a wireless communication with an external apparatus, the communication I/F 108 includes an antenna. The bus 109 connects the units of the sound processing apparatus to transmit information.

In the present exemplary embodiment, the display unit 106 and the operation unit 105 are present in the sound processing apparatus. However, at least one of the display unit 106 and the operation unit 105 may be present as another apparatus on the outside of the sound processing apparatus.

In the present exemplary embodiment, the CPU 102 executes processes according to programs stored in the ROM 107 and the external storage unit 104, thereby executing each function and each process of the sound processing apparatus illustrated in FIG. 1, as described above.

Figure 5:
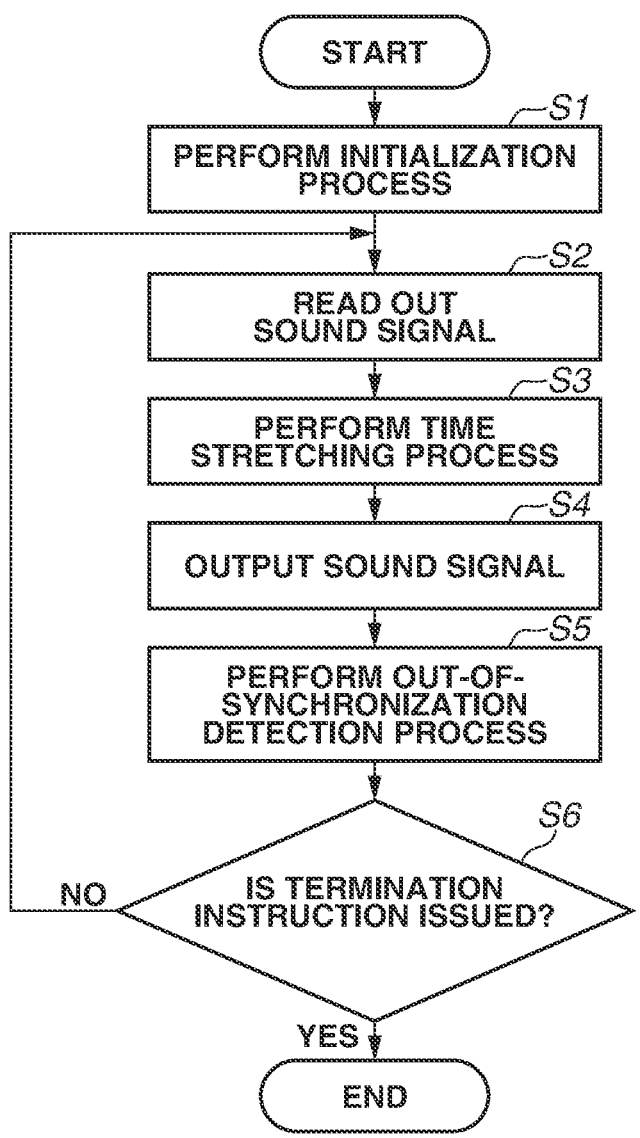
FIG. 5 is a flowchart illustrating a sound process.

FIG. 5 is a flowchart illustrating a sound process flow to be executed by the sound processing apparatus according to the present exemplary embodiment that includes the functional configuration illustrated in FIG. 1. In each flowchart to be described below, reference symbol "S" denotes a process step.

In step S1, the sound processing apparatus performs an initialization process on each of the components illustrated in FIG. 1 or 4. Subsequent processes of steps S2 to S6 are repeated until a predetermined condition is satisfied. In the present exemplary embodiment, a condition indicating that a termination instruction is issued from the user as described below is set as the predetermined condition.

In step S2, the signal readout unit 3 reads out sound signal data corresponding to the virtual camera information sequentially received by the information reception unit 1 from the accumulation unit 2. During this sound signal readout process, the time information generation unit 8 generates a time information table and outputs the generated time information table to the signal readout unit 3. The signal readout unit 3 delivers the time information table output from the time information generation unit 8 and the sound signal data read out from the accumulation unit 2 to the time stretching unit 4. The process of step S2 will be described in detail below with reference to a flowchart illustrated in FIG. 6 described below.

In step S3, the time stretching unit 4 performs the time stretching process based on the time information table received from the signal readout unit 3 and the time lag amount received from the time lag detection unit 5. During this process, the time information generation unit 9 generates (reconfigures) the time information table to match the result of the time stretching process, and outputs the generated time information table to the time stretching unit 4. The time stretching unit 4 delivers the time information table and the sound signal obtained after the time stretching process to the signal output unit 6. The process performed in step S3 will be described in detail below with reference to a flowchart illustrated in FIG. 7 described below.

In step S4, the signal output unit 6 performs a digital-to-analog (DA) conversion and amplification on the sound signal obtained after the time stretching process, and outputs the sound signal to the speaker 7. As a result, sound corresponding to the sound signal is output from the speaker 7. The signal output unit 6 also calculates the playback sound time based on the time information table, and delivers the calculated playback sound time to the time lag detection unit 5. The process performed in step S4 will be described in detail below with reference to a flowchart illustrated in FIG. 8 described below.

In step S5, the time lag detection unit 5 detects, as the time lag amount, out-of-synchronization between the video image and the sound based on the playback video timecode received from the external apparatus and the time of the playback sound signal received from the signal output unit 6, and sends the time lag amount to the time stretching unit 4. The process performed in step S5 will be described in detail below with reference to a flowchart illustrated in FIG. 9 described below.

In step S6, the sound processing apparatus determines whether the termination instruction has been issued by a user operation received through the operation unit 105. If the termination instruction is not issued (NO in step S6), the processing returns to step S2. In contrast, if the termination instruction has been issued (YES in step S6), the processing in the flowchart illustrated in FIG. 5 is terminated, or the sound process according to the present exemplary embodiment is terminated.

Figure 6:
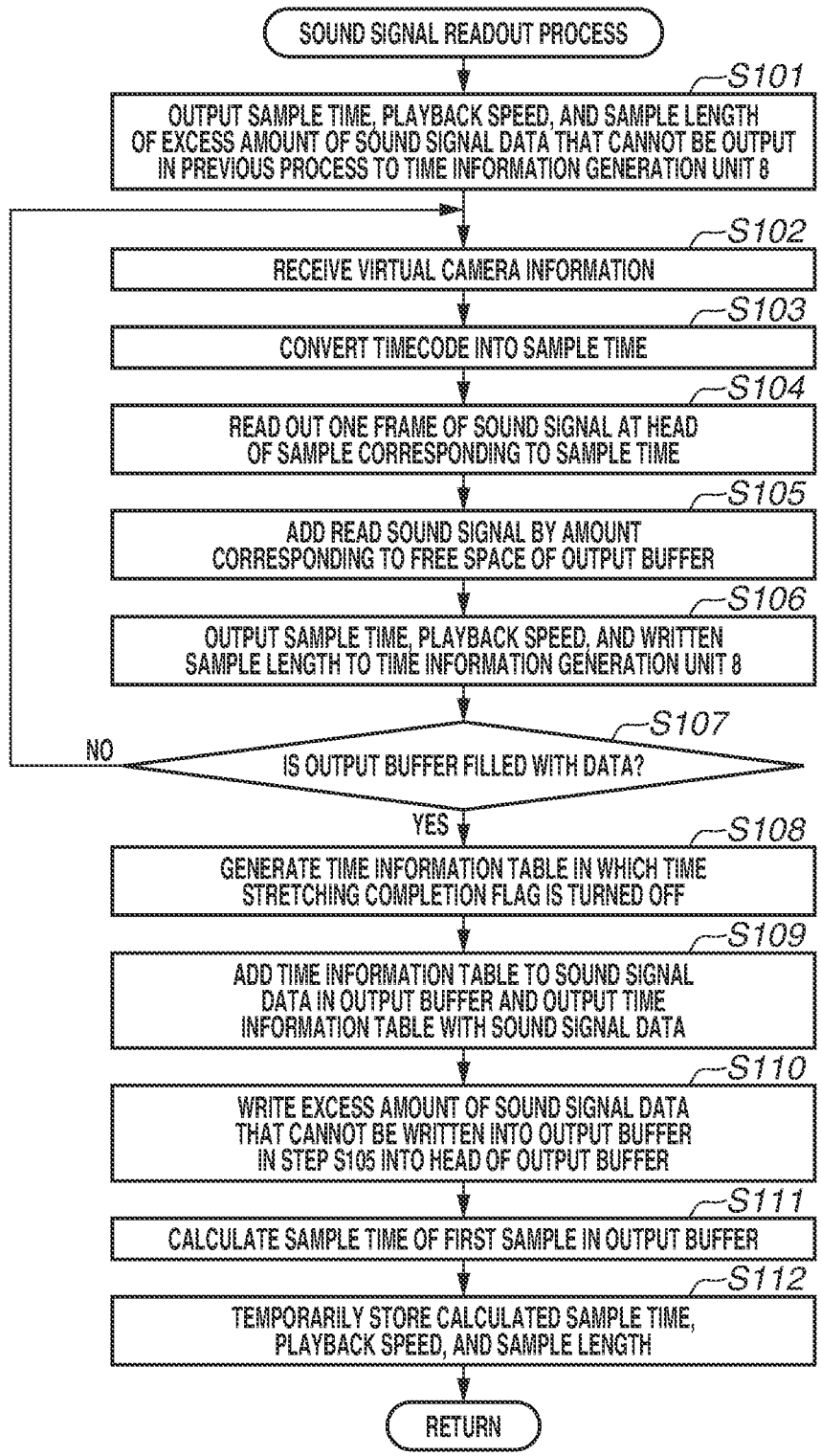
FIG. 6 is a flowchart illustrating a sound signal readout process.

FIG. 6 is a flowchart illustrating a detailed flow of the sound signal readout process performed in step S2 illustrated in FIG. 5.

In step S101, the signal readout unit 3 outputs, to the time information generation unit 8, information indicating the sample time, playback speed, and sample length of an excess amount of sound signal data that has not been output in the previous process. The information indicating the sample time, the playback speed, and the sample length is stored in a prescribed area on the RAM 103 in the previous process. However, if the information is not stored, the signal readout unit 3 performs no further operation.

Subsequent processes performed in steps S102 to S106 are repeated until a predetermined condition is satisfied. In a case of the flowchart illustrated in FIG. 6, a condition indicating that the output buffer included in the signal readout unit 3 is filled with data is set as the predetermined condition.

In step S102, the signal readout unit 3 receives the virtual camera information output from the information reception unit 1.

In step S103, the signal readout unit 3 converts the timecode in the virtual camera information received in step S102 into the sample time illustrated in FIG. 3B. The process of converting the timecode for each frame into time is a known process in video image processing-related fields, and thus the detailed description thereof is omitted.

In step S104, the signal readout unit 3 reads out, from the accumulation unit 2, a sound signal of a time length corresponding to one frame of a video image, starting from a sound sample corresponding to the sample time obtained in step S103 as a first sample, and temporarily stores the sound signal in a prescribed area on the RAM 103.

In step S105, the signal readout unit 3 adds the sound signal read out in step S104 by the amount corresponding to a free space of the output buffer included in the signal readout unit 3. If the free space of the output buffer is more than or equal to one frame, the signal readout unit 3 writes the entire sound signal read out in step S104 into the output buffer. In contrast, if the free space of the output buffer is less than one frame, the signal readout unit 3 writes the amount of data corresponding to the sample length that can be written into the free space. In the present exemplary embodiment, the output buffer is secured in a prescribed area on the RAM 103. The size of the output buffer is the same as the size of the sound signal to be processed at one time by the time stretching unit 4 to which data is output.

In step S106, the signal readout unit 3 outputs, to the time information generation unit 8, the information about the sample time obtained in step S103, the information about the playback speed in the virtual camera information received in step S102, and the information about the sample length written in step S105.

In step S107, the signal readout unit 3 determines whether the output buffer is filled with data. As a result of this determination, if the output buffer is not filled with data (NO in step S107), the processing returns to step S102 and the signal readout unit 3 repeatedly performs the subsequent processes. In contrast, if the output buffer is filled with data (YES in step S107), the processing proceeds to step S108.

In step S108, the time information generation unit 8 generates the time information table including a set of three elements, e.g., the sample time, the playback speed, and the sample length that are output from the signal readout unit 3 in the previous processes. These elements are listed in a table in accordance with the order in which the elements are output. Thus, the time information table that matches the sound signal written into the output buffer in the signal readout unit 3 is generated. The time information table generated in step S108 is output to the signal readout unit 3. In step S109, the signal readout unit 3 adds the time information table to the sound signal data in the output buffer, and outputs the time information table with the sound signal data to the time stretching unit 4.

In step S110, the signal readout unit 3 writes an excess amount of sound signal data that has not been written into the output buffer in step S105 into the head of the output buffer.

In step S111, the signal readout unit 3 calculates the time of the first sample in the output buffer. Time Tw of the first sample in the output buffer can be obtained by the following Expression (1).

$$Tw = T + L/fs, \quad (1)$$

where fs is the default sampling rate of the sound signal to be input or output by the sound processing apparatus according to the present exemplary embodiment, T is the sample time output in the previous step S106, and L is the sample length.

In step S112, the signal readout unit 3 temporarily stores information indicating the sample time calculated in step S111, the playback speed output in the previous step S106, and the sample length written in step S110, in a prescribed area on the RAM 103. The information is output to the time information generation unit 8 in step S101 in the subsequent sound signal readout process.

After completion of the process of step S112, the audio processing apparatus returns after the signal readout process is completed.

Figure 7:
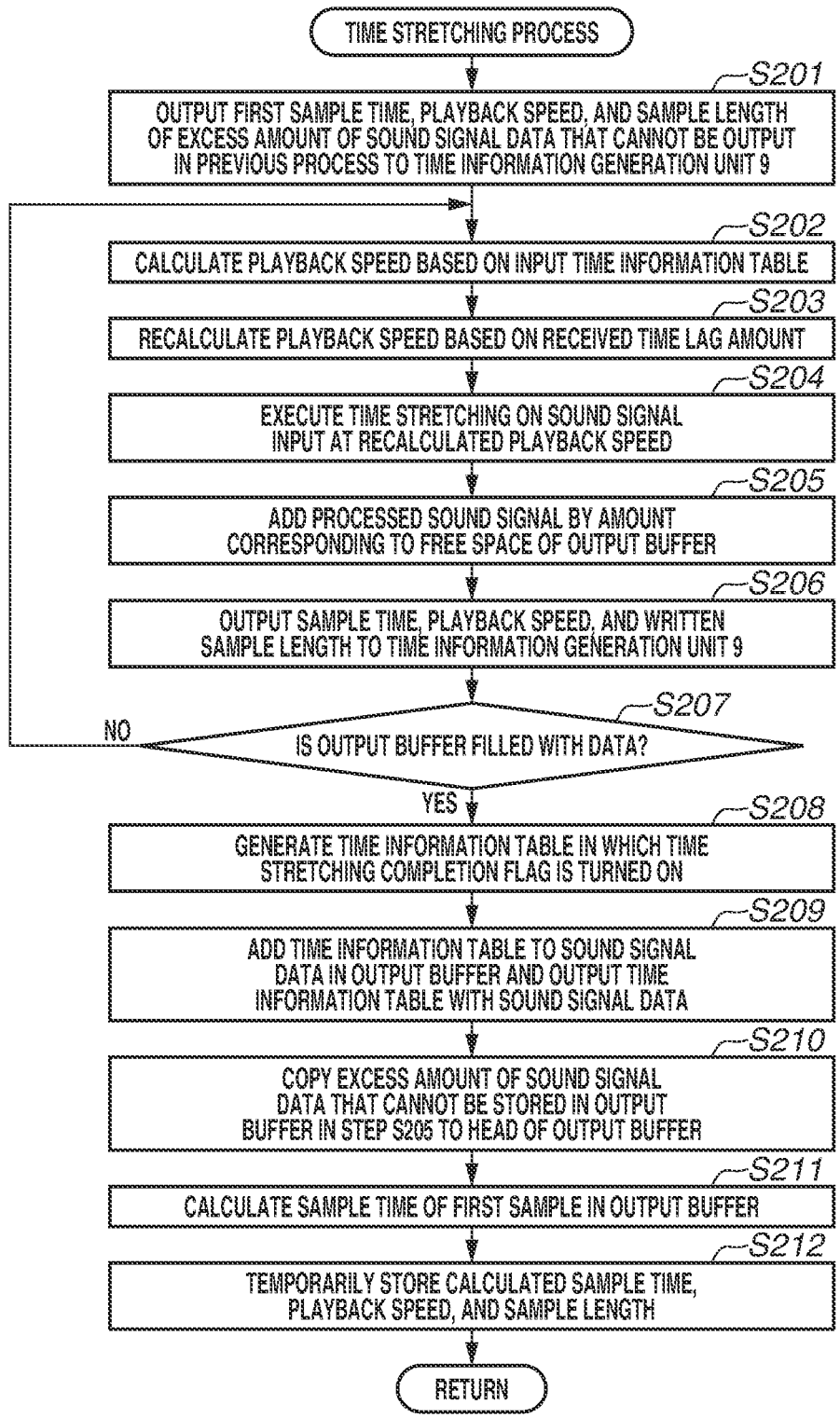
FIG. 7 is a flowchart illustrating a time stretching process.

FIG. 7 is a flowchart illustrating a detailed processing flow of the time stretching process in step S3 illustrated in FIG. 5.

In step S201, the time stretching unit 4 outputs a set of three elements, e.g., the first sample time, the playback speed, and the sample length of an excess amount of sound signal data that has not been output in the previous process, to the time information generation unit 9. These pieces of information are temporarily stored in a prescribed area on the RAM 103. If there is no excess amount of sound signal data, the time stretching unit 4 performs no further operation.

Subsequent processes in steps S202 to S206 are repeated until a predetermined condition is satisfied. In the case of the flowchart illustrated in FIG. 7, a condition indicating that the output buffer included in the time stretching unit 4 is filled with data is set as the predetermined condition.

In step S202, the time stretching unit 4 recalculates the playback speed based on the time information table received from the signal readout unit 3. In this case, only a process for one playback speed can be typically performed on each processing unit in the time stretching process that is based on resampling. In the present exemplary embodiment, the sound signal data is input per processing unit. The time stretching unit 4 therefore calculates a single playback speed to avoid a time lag from occurring due to the process based on the input time information table.

Specifically, the time stretching unit 4 calculates a weighted average of the playback speed based on the weight of the sample length. For example, a playback speed V can be obtained by the following expression (2) in a case of the time information table illustrated in FIG. 3.

$$V = \Sigma(\text{playback speed } i \times \text{sample length } i)/Ltn, \quad (2)$$

where $1 \leq i \leq n$, n is the number of elements included in the time information table, and Ltn is the total number of sample lengths obtained by adding all the sample lengths in the time information table.

In step S203, the time stretching unit 4 corrects the playback speed obtained in step S202 based on the time lag amount received from the time lag detection unit 5.

In such a case, the time lag amount of the latest value obtained in each process is transmitted from the time lag detection unit 5. However, if the playback speed is corrected in one process based on the time lag amount, a feedback control operation may be performed to a large extent, which may make it difficult to bring the control operation to an end and may cause severe oscillations (variations) in the playback speed. If the playback speed is rapidly controlled, a problem may occur in the sound quality. For the reasons described above, the time stretching unit 4 corrects the playback speed by a preset ratio in the time lag amount received from the time lag detection unit 5. For example, a correction speed Vc with respect to the playback speed V can be obtained by the following expression (3).

$$Vc = (Ltn + Mt \times r \times fs)/Ltn \times V, \quad (3)$$

where, Mt[sec] is the received time lag amount, r is the preset ratio ($0 < r < 1$), Ltn is the total number of sample lengths, fs is the sampling rate of the sound signal, and V is the playback speed.

This process makes it possible to appropriately control the playback speed depending on the time lag amount detected by the time lag detection unit 5. The time lag between the video image and the sound can thereby be corrected.

In step S204, the time stretching unit 4 executes the time stretching process on the input sound signal based on the playback speed corrected in step S203. In the present exemplary embodiment, the time stretching unit 4 executes the time stretching process based on the resampling process. For example, if the playback speed scale factor is 0.5, the time stretching unit 4 performs the time stretching process such that the number of samples in the middle of each sample can be increased and the total number of samples can be doubled. For example, if the playback speed scale factor is 2.0, the time stretching unit 4 performs the time stretching process such that the number of samples can be halved.

However, high frequency components and aliasing that have not appeared in the original signal may occur due to an increase or decrease in the number of samples. Thus, an appropriately designed low-pass filter (LPF) process is executed to eliminate the high frequency components and aliasing. As a process in which the resampling process and the LPF process are simultaneously performed, in the present exemplary embodiment, a process of designing and superimposing a finite impulse response (FIR) function by a sine function to which window processing is applied is carried out. When the resampling process is performed, the pitch of the sound varies. Thus, a process of converting the speed is performed while maintaining the pitch of the original signal by performing a pitch conversion process as well as the resampling process, in the present exemplary embodiment. Then, the time stretching unit 4 stores the sound signal obtained as a result of these processes in a prescribed area on the RAM 103.

In step S205, the time stretching unit 4 adds the processed sound signal by the amount corresponding to the free space of the output buffer in the time stretching unit 4. The output buffer in the time stretching unit 4 is secured in a prescribed area on the RAM 103. At least an area corresponding to the processing unit in the signal output unit 6, which is a subsequent-stage component, is secured as the size of the output buffer.

In step S206, the time stretching unit 4 outputs the information indicating the sample time of the sound signal written into the output buffer in step S205, the playback speed calculated in step S203, and the sample length obtained after the time stretching process is executed in step S204, to the time information generation unit 9.

In step S207, the time stretching unit 4 determines whether the output buffer is filled with data. If the output buffer is not filled with data (NO in step S207) as a result of determination, the processing returns to step S202 and the time stretching unit 4 performs the subsequent repeated processes. If the output buffer is filled with data (YES in step S207), in contrast, the processing proceeds to step S208.

In step S208, the time information generation unit 9 generates a time information table including a set of three elements, e.g., the sample time, the playback speed, and the sample length that has been output from the time stretching unit 4 in the previous processes. These elements are listed in a table in accordance with the order in which the elements are output. Thus, the time information table that matches the sound signal written into the output buffer included in the time stretching unit 4 is generated. The generated time information table is output to the time stretching unit 4.

In step S209, the time stretching unit 4 adds the time information table to data in the output buffer. The time information table is then output to the signal output unit 6 together with the sound signal data.

In step S210, the time stretching unit 4 writes (copies) the excess amount of sound signal data that has not been written into the output buffer in step S205 into the head of the output buffer.

In step S211, the time stretching unit 4 calculates the sample time of the first sample in the output buffer.

In step S212, the time stretching unit 4 temporarily stores information indicating the sample time calculated in step S211, the playback speed calculated in step S203, and the sample length copied in step S210, into a prescribed area on the RAM 103. These pieces of information are output to the time information generation unit 9 in step S201 in the subsequent time stretching process.

After completion of the process of step S212, the sound processing apparatus returns after the time stretching process is completed.

Figure 8:
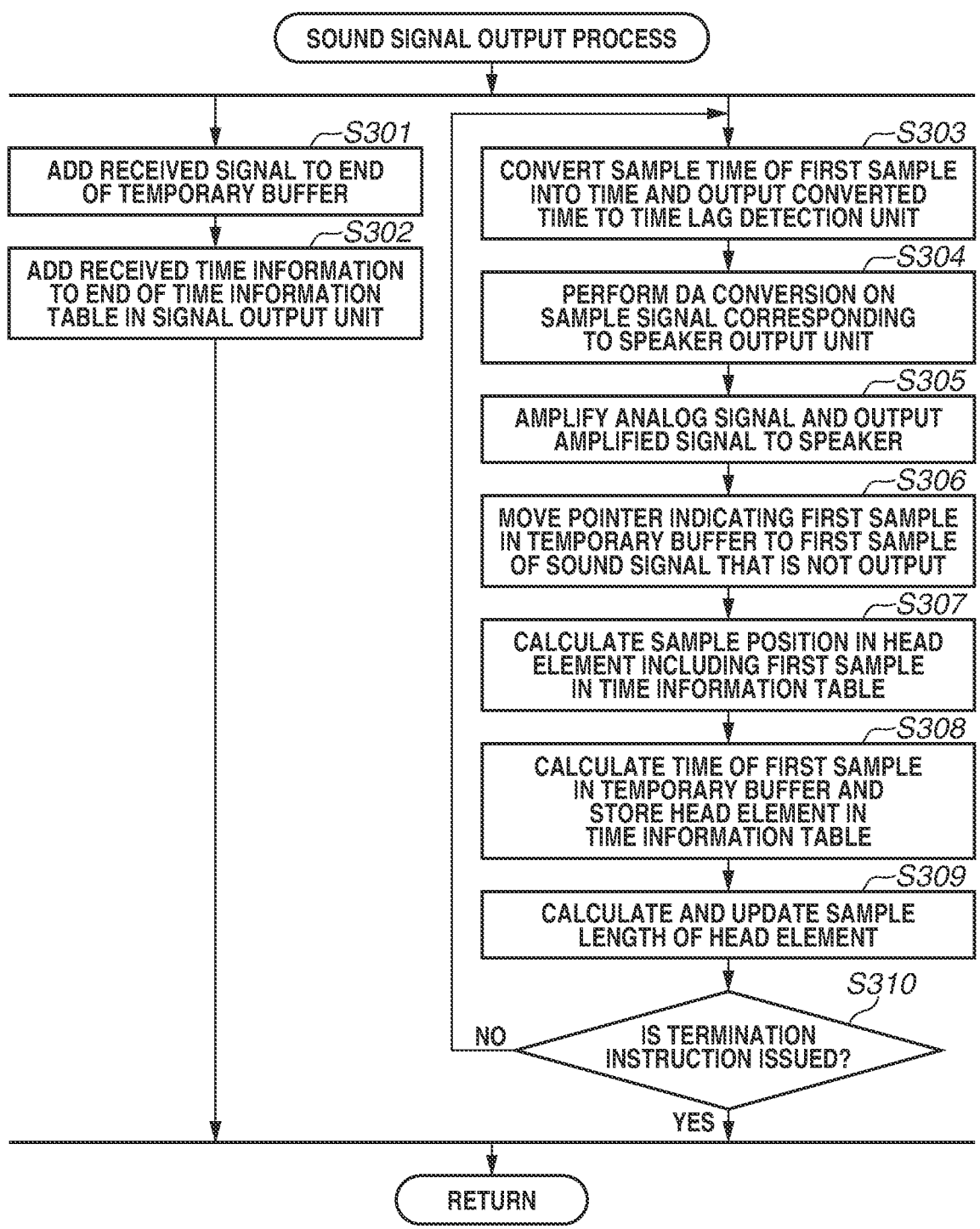
FIG. 8 is a flowchart illustrating a sound signal output process.

FIG. 8 is a flowchart illustrating a detailed flow of the sound signal output process in step S4 illustrated in FIG. 5. The processes in steps S301 to S302 and the processes in steps S303 to S310 are executed in parallel. The processes in steps S303 to S310 are processes for converting the sound signal into sound and outputting the sound. It may be desirable to prevent the sound from being interrupted, and thus, the flowchart illustrated in FIG. 8 is executed.

In step S301, the signal output unit 6 adds the signal received from the time stretching unit 4 to an end of a temporary buffer in the signal output unit 6. In the present exemplary embodiment, the temporary buffer in the signal output unit 6 is secured in, for example, a prescribed area on the RAM 103.

In step S302, the signal output unit 6 adds the set of three elements except the time stretching completion flag in the time information table received from the time stretching unit 4 to the end of the time information table held in the signal output unit 6. After completion of the process of step S302, the signal output unit 6 completes the processes in step S301 to S302, and returns.

In contrast, the processes in steps S303 to S310 are repeatedly performed until a predetermined condition is satisfied. In this case, a condition indicating that the termination instruction is issued from the user is set as the predetermined condition.

In step S303, the signal output unit 6 reads out the sample time of the first sample in the temporary buffer from a head element of the time information table included in the signal output unit 6, converts the sample time into time, and outputs the time to the time lag detection unit 5. The conversion from the sample time to the time is performed by a calculation for converting the excess number of samples into time on the order of milliseconds or less. The time is hereinafter referred to as "excess time". The signal output unit 6 sends information about the excess time thus obtained in place of the excess number of samples, to the time lag detection unit 5. An excess time tm can be obtained by the following expression (4).

$$tm = m \times V/fs, \quad (4)$$

where fs is the sampling rate of the sound signal, m is the excess number of samples, and V is the playback speed.

In step S304, the signal output unit 6 reads out the sound signal of the sample length corresponding to a speaker output unit from the temporary buffer and performs a DA conversion on the sound signal, thereby converting a digital sound signal into an analog sound signal. The sample length corresponding to the speaker output unit is preliminarily determined in the initial setting in step S1 illustrated in FIG. 5.

In step S305, the signal output unit 6 appropriately amplifies the analog sound signal obtained in step S304, and outputs the amplified signal to the speaker 7. The speaker 7 converts the sound signal corresponding to the time output to the time lag detection unit 5 in step S303 into sound and outputs the sound, accordingly.

In step S306, the signal output unit 6 moves a pointer indicating the first sample in the temporary buffer to the position corresponding to the first sample of the sound signal that is accumulated in the temporary buffer and is not output.

In step S307, the signal output unit 6 searches for an element including the first sample designated in step S306 in the time information table included in the signal output unit 6, and sets the element as the head element. The signal output unit 6 further calculates the sample position in the element. In the sound output process, all the samples accumulated in the temporary buffer are treated in the same manner. The sample lengths are sequentially added in order from the head element of the time information table, and the element that exceeds the sample length corresponding to the speaker output unit is included in the first sample, accordingly. A sample position p in the element can be calculated by the following expression (5).

$$p = Lo - La + 1, \quad (5)$$

where La is the total sample length in a range from the head element of the time information table to an element prior to the head element, and Lo is the sample length corresponding to the speaker output unit.

In step S308, the signal output unit 6 calculates the time of the first sample based on the sample position obtained in step S307. The time of the first sample is obtained by converting the sample position p into time and adding the time to a sample time "to" of the head element of the time information table. Sample time t can be obtained by the following expression (6).

$$t = to + ((p-1) \times v), \quad (6)$$

where t is the sample time to be obtained, and v is the playback speed of the head element.

The sample time thus obtained is stored in the head element of the time information table.

In step S309, the signal output unit 6 calculates the sample length of the head element of the time information table based on the sample position obtained in step S307, and updates the sample length. Sample length 1 can be obtained by the following expression (7), $$l = lf(p-1), \quad (7)$$

where p is the sample position, and lf is the original sample length.

The sample length thus obtained is stored in the head element of the time information table.

In step S310, the sound processing apparatus determines whether the termination instruction is issued by a user operation or the like through the operation unit 105. If the termination instruction is issued (YES in step S310), the sound processing apparatus completes the repeated processes in steps S303 to S309 in the flowchart illustrated in FIG. 8, and returns. If the termination instruction is not issued (NO in step S310), the processing returns to step S303 and the sound processing apparatus thereby performs the subsequent repeated processes.

Figure 9:
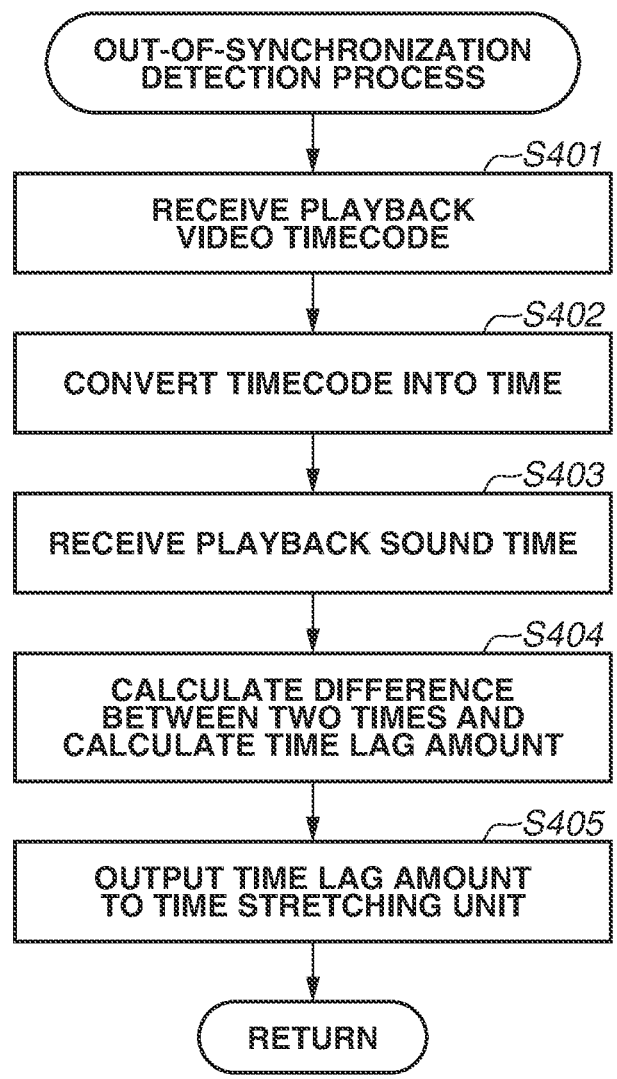
FIG. 9 is a flowchart illustrating an out-of-synchronization detection process.

FIG. 9 is a flowchart illustrating a detailed processing flow of the out-of-synchronization detection process in step S5 illustrated in FIG. 5.

In step S401, the time lag detection unit 5 receives the playback timecode from an external apparatus.

The same time axis is shared between the playback video timecode and the timecode added to the virtual camera information received by the information reception unit 1.

In step S402, the time lag detection unit 5 converts the playback video timecode acquired in step S401 into time (referred to as playback video image time). A technique for converting the timecode into time is known in the video image playback field, and thus the detailed description thereof is omitted.

In step S403, the time lag detection unit 5 receives time (referred to as playback sound time) of the sound signal output from the signal output unit 6.

In step S404, the time lag detection unit 5 calculates the difference between the time of the playback video image time obtained in step S402 and the playback sound time received in step S403. As a result, a time lag amount indicating an out-of-synchronization period between the video image and the sound is obtained. The time lag detection unit 5 outputs information about the time lag amount calculated in step S405 to the time stretching unit 4. As described above, the output time lag amount is added in the recalculation of the playback speed in step S202 illustrated in FIG. 7, and is further corrected in step S203, and then the time lag amount is used for the time stretching process in step S204. After completion of the process of step S405, the time lag detection unit 5 completes the out-of-synchronization detection process and returns.

As described above, the sound processing apparatus according to the present exemplary embodiment adds the time information table including a set of a plurality of elements, including at least time and a playback speed, to a segment of a sound signal, thereby making it possible to recognize the accurate time of the sound signal to be processed. In other words, the sound processing apparatus according to the first exemplary embodiment transmits the time information table including a set of three elements, e.g., time, a playback speed, and a sample length, as information with a sound signal, thereby enabling each processing module (each functional unit) to recognize the accurate time of the sample that is being processed. According to the present exemplary embodiment, since each processing module can recognize the accurate time of the sample that is being processed even when the playback speed varies with time, the out-of-synchronization between a video image and sound can be detected and the video image and the sound can be synchronized even after the time stretching process has been executed.

Second Exemplary Embodiment

The first exemplary embodiment described above illustrates an example where sound is output immediately after the time stretching process is executed. A second exemplary embodiment illustrates an example where a delay process is performed after the time stretching process and the out-of-synchronization between a video image and sound is corrected by performing both the time stretching process and the delay process. In the second exemplary embodiment, descriptions of components and processes similar to those of the first exemplary embodiment are omitted. A hardware configuration of a sound processing apparatus according to the second exemplary embodiment is similar to the hardware configuration illustrated in FIG. 4.

Figure 10:
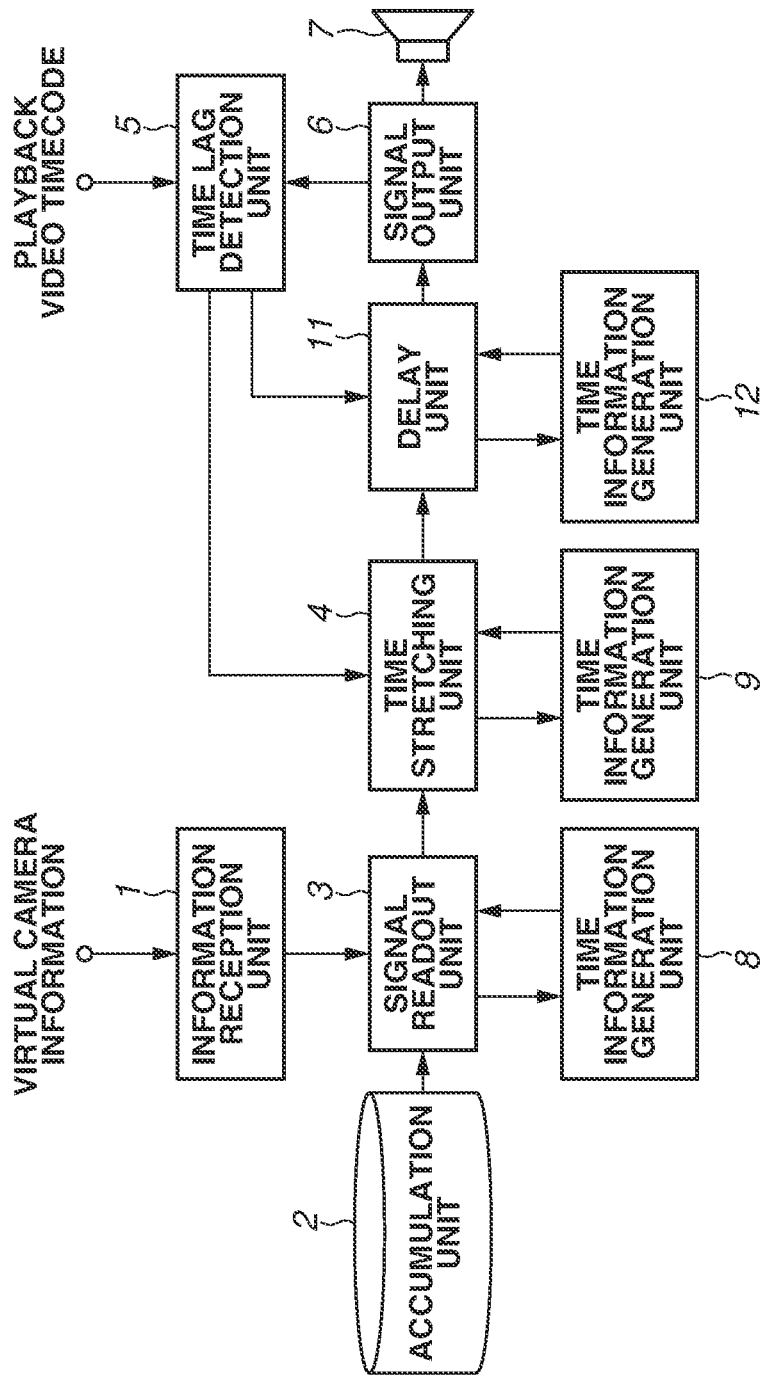
FIG. 10 illustrates a configuration example of a sound processing apparatus according to one or more aspects of the present disclosure.

FIG. 10 illustrates a functional configuration example of the sound processing apparatus according to the second exemplary embodiment. In FIG. 10, the components ranging from an information reception unit 1 to a time information generation unit 9 have the same configurations as those illustrated in FIG. 1, and thus the descriptions thereof are omitted. The sound processing apparatus according to the second exemplary embodiment includes a delay unit 11 and a time information generation unit 12.

The delay unit 11 receives a sound signal output from the time stretching unit 4, and receives a time lag amount detected by the time lag detection unit 5 as a delay process control signal. The delay unit 11 delays the sound signal output from the time stretching unit 4 by a control signal depending on the time lag amount. In parallel, the delay unit 11 changes elements in the time information table output from the time stretching unit 4 depending on the number of samples to be delayed, and outputs the elements to the time information generation unit 12.

The time information generation unit 12 generates (reconfigures) the time information table based on the information sent from the delay unit 11, and outputs the generated time information table to the delay unit 11. At the time of outputting the sound signal, the delay unit 11 receives the time information table generated by the time information generation unit 12, and outputs the time information table with the sound signal obtained after the delay process to the signal output unit 6.

Figure 11:
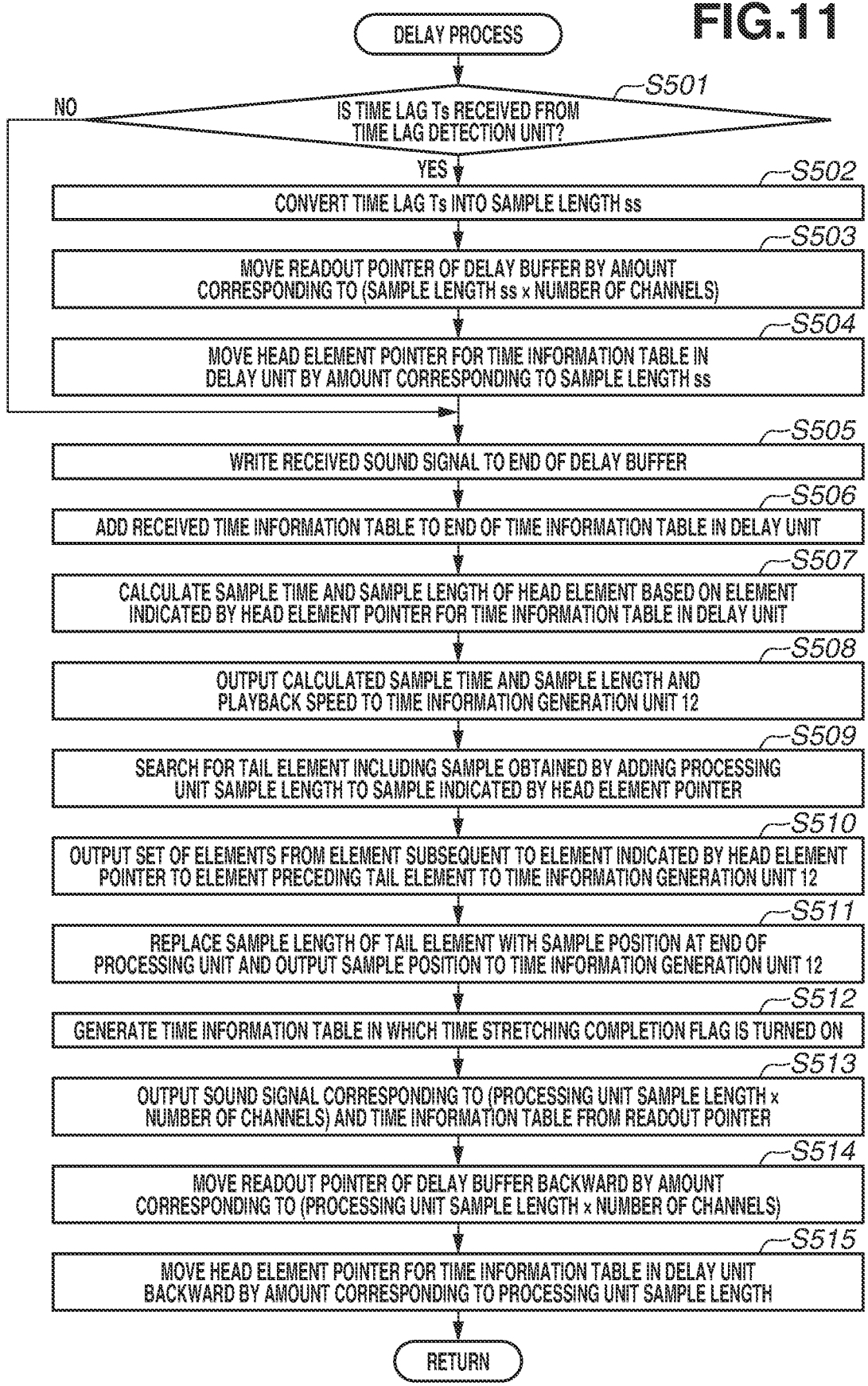
FIG. 11 is a flowchart illustrating a delay process.

FIG. 11 is a flowchart illustrating a processing flow to be executed by the delay unit 11 of the sound processing apparatus according to the second exemplary embodiment. In the second exemplary embodiment, the delay process to be executed by the delay unit 11 is performed between the time stretching process in step S3 and the sound signal output process in step S4 of the flowchart illustrated in FIG. 5 described above.

In step S501, the delay unit 11 determines whether information (time lag Ts in the present exemplary embodiment) indicating the time lag amount has been received from the time lag detection unit 5. If the delay unit 11 has received the time lag Ts (YES in step S501), the processing proceeds to step S502. In contrast, if the delay unit 11 has not received the time lag Ts (NO in step S501), the processing proceeds to step S505. In general, a processing load on a video image process is much larger than that on a sound process. A video image is likely to have a delay with respect to sound, accordingly. Thus, when the time lag Ts is positive, the time lag Ts indicates that the output of a video image is delayed from the output of sound, in the present exemplary embodiment.

Steps S502 to S504 are processes for correcting the time lag notified by the time lag detection unit 5.

In step S502, the delay unit 11 converts the time lag Ts into a sample length ss. The time lag Ts is a period corresponding to the time lag amount detected when sound is output, and thus is determined regardless of the playback speed. In the second exemplary embodiment, the sample length ss is obtained by the following expression (8), accordingly.

$$ss=Ts[\text{sec}]/fs[\text{Hz}], \qquad (8)$$

where fs is the sampling rate of the sound signal.

In step S503, the delay unit 11 moves a readout pointer of a delay buffer in the delay unit 11 forward by the amount corresponding to (sample length ss×the number of channels). Thus, the time lag Ts is added to the delay time obtained by the delay unit 11, thereby correcting the out-of-synchronization.

In step S504, the delay unit 11 moves a head element pointer for the time information table in the delay unit 11 forward by the amount corresponding to the number of samples of the sample length ss. In the present exemplary embodiment, the head element pointer is a pointer indicating an element including a first sample to be subsequently output in the set of three elements stored in the time information table in the delay unit 11.

Figure 12:
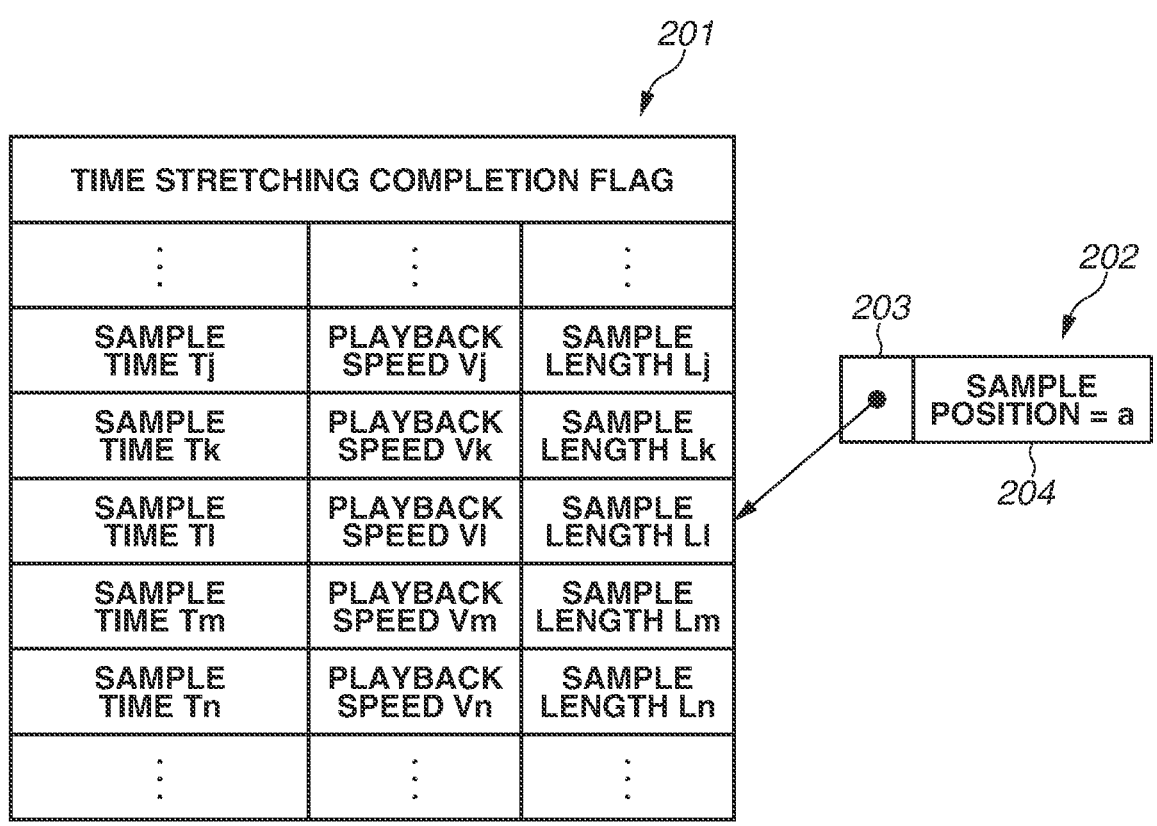
FIG. 12 illustrates a head element pointer.

FIG. 12 illustrates an image indicating that the head element pointer according to the second exemplary embodiment indicates the head element of the time information table in the delay unit 111. A time information table 201 illustrated in FIG. 12 is a time information table in the delay unit 11, and a head element pointer 202 is composed of a pointer 203 indicating an element and a sample position 204. The sample position indicates the position of the first sample in the element indicated by the pointer 203. The head element pointer 202 illustrated in FIG. 12 indicates a state where an a-th sample in the element at sample time T1 corresponds to the first sample.

Assume herein that the head element pointer 202 is moved forward by the amount corresponding to the number of samples of the sample length ss from the state illustrated in FIG. 12. In this example, the delay unit 11 searches for an element including the sample preceding by the number of samples of the sample length ss, from the sample length of each element. If this element corresponds to the element at sample time Tj, a sample position b of the head element pointer obtained after the time is shifted can be calculated by the following expression (9) based on the sample length ss, the sample length Lj at the sample time Tj, and a sample length Lk at sample time Tk.

$$b=Lj-(ss-(a-1)-Lk) \qquad (9)$$

The sample position thus obtained is stored in the head element pointer. The process in step S504 makes it possible to accurately move the elements in the time information table based on the correction of the out-of-synchronization between the video image and the sound.

In step S505, the delay unit 11 writes the sound signal received from the time stretching unit 4 into the end of the delay buffer.

In step S506, the delay unit 11 adds each element in the time information table received from the time stretching unit 4 to the end of the time information table in the delay unit 11.

In the processes in steps S507 to S512, the delay unit 11 generates the time information table corresponding to a segment of the sound signal to be output.

In step S507, the delay unit 11 calculates the sample time and sample length of the head element based on the element indicated by the head element pointer in the time information table included in the delay unit 11. The sample time and sample length can be calculated by calculations similar to those in steps S308 and S309 according to the first exemplary embodiment using the first sample position of the head element pointer.

In step S508, the delay unit 11 outputs a set of three elements, e.g., the sample time and the sample length obtained in step S507, and the playback speed of the element indicated by the head element pointer, to the time information generation unit 12.

In step S509, the delay unit 11 searches for a tail element including a sample obtained by adding the processing unit sample length in the delay unit 11 to the sample indicated by the head element pointer. In the search, it may be desirable to acquire the first following element that satisfies the following expression (10).

$$sd \leq st-x+1+sg, \qquad (10)$$

where sd is the processing unit sample length in the delay unit 11, st is the sample length of the head element, x is the sample position of the head element pointer, and sg is the total sample length from the element subsequent to the head element.

In step S510, the delay unit 11 sequentially outputs the set of three elements from the element subsequent to the element indicated by the head element pointer to the element preceding the tail element in the time information table included in the delay unit 11, to the time information generation unit 12.

In step S511, the delay unit 11 replaces the sample length of the tail element searched in the search process in step S509 with the sample position at the end of the processing unit, and outputs the sample position to the time information generation unit 12. Under the condition set in step S509, a sample position e at the end of the processing unit can be calculated by the following expression (11).

$$e=sd-(st-x+1+sp), \quad (11)$$

where sp is the total sample length from the element subsequent to the head element to the element preceding the tail element.

Step S512 is similar to step S208 according to the first exemplary embodiment, and thus the description thereof is omitted.

In step S513, the delay unit 11 outputs, from the readout pointer, the sound signal corresponding to (processing unit sample length×the number of channels) among the sound signals stored in the delay buffer together with the time information table obtained in step S512. Thus, the time information synchronized with the sound signal is output together with the sound signal even when the delay process is performed.

In step S514, the delay unit 11 moves the readout pointer of the delay buffer backward by the amount corresponding to (processing unit sample length×the number of channels) i.e., by the amount for the output sound signal.

In step S515, the delay unit 11 moves the head element pointer for the time information table included in the delay unit 11 backward by the amount corresponding to the processing unit sample length. In this process, the head element pointer may be moved to indicate the sample subsequent to the sample position e obtained in step S511. After completion of the process in step S515, the delay unit 11 completes the delay process and returns.

Figure 13:
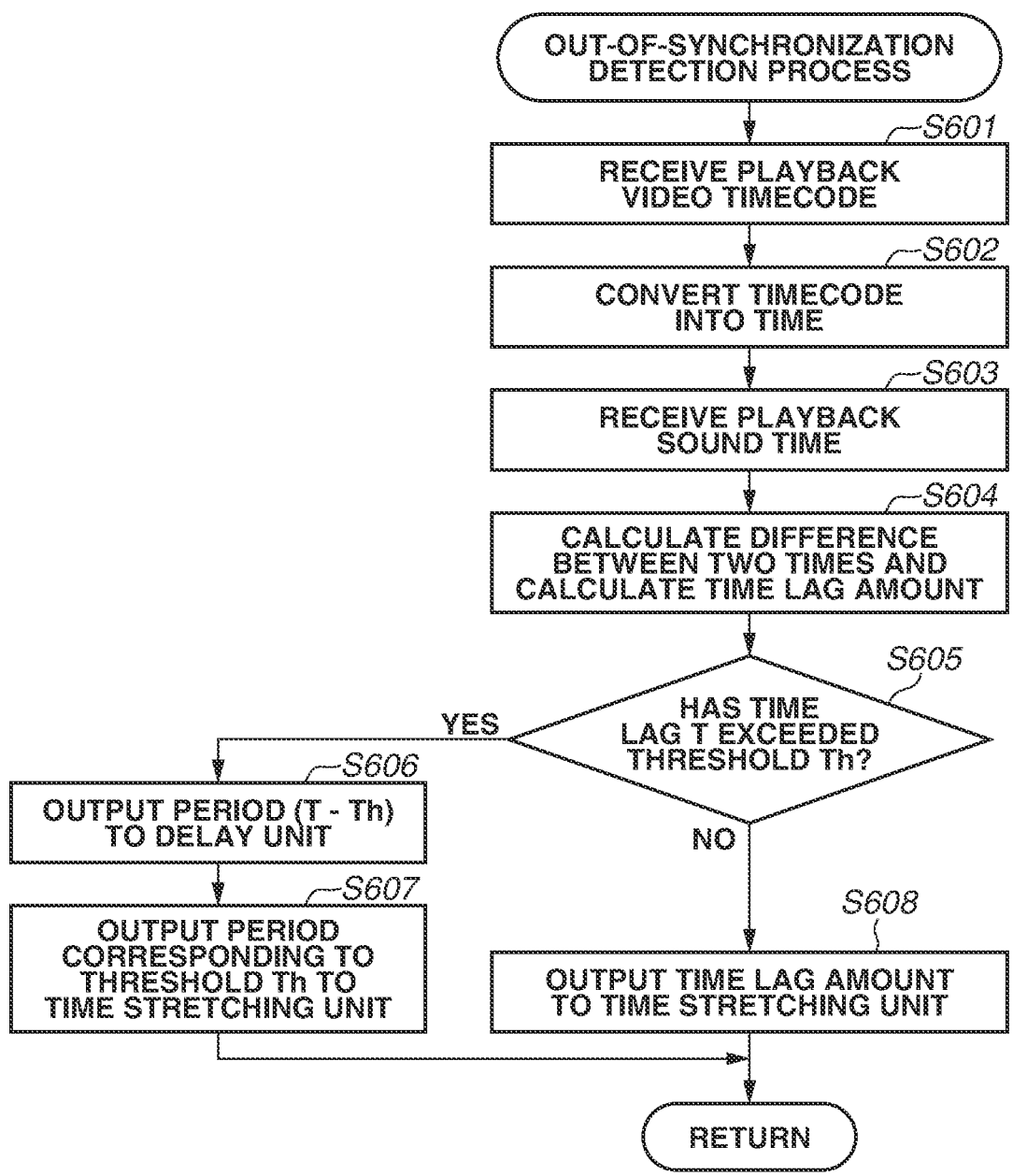
FIG. 13 is a flowchart illustrating an out-of-synchronization detection process according to one or more aspects of the present disclosure.

FIG. 13 is a flowchart illustrating a detailed flow of the out-of-synchronization detection process to be executed by the time lag detection unit 5 according to the second exemplary embodiment. The processes in steps S601 to S604 are respectively similar to the processes in steps S401 to S404 according to the first exemplary embodiment, and thus the descriptions thereof are omitted.

In step S605, the time lag detection unit 5 determines whether a time lag T corresponding to the time lag amount calculated in step S604 has exceeded a default time threshold Th. If the time lag T has exceeded the threshold Th (YES in step S605), the processing proceeds to step S606. If the time lag T has not exceeded the threshold Th (NO in step S605), the processing proceeds to step S608.

In step S606, the time lag detection unit 5 detects a period (T−Th) as the time lag and sends a notification indicating the time lag to the delay unit 11. Thus, the delay unit 11 performs the process of correcting the time lag in the subsequent process, as described above.

In step S607, the time lag detection unit 5 outputs the period of the threshold Th as the time lag to the time stretching unit 4. The time stretching unit 4 performs the process of correcting the time lag in the subsequent process, accordingly.

As described above, the threshold for the period is determined and the delay unit 11 corrects the time lag that corresponds to the time lag amount and has exceeded the threshold. Further, the time stretching unit 4 performs the time stretching process on the time lag equal to or less than the threshold. In the second exemplary embodiment, the time lag is corrected in each process, and thus, a large time lag does not occur unless some serious problem occurs in the video image process or the sound process. In the second exemplary embodiment, the large time lag between the video image and the sound that occurs in an initial operation is corrected mainly by the delay unit 11, and small time lag is corrected little by little mainly in the time stretching process in the subsequent processes. Thus, the time lag between the video image and the sound is constantly and automatically corrected.

After completion of the process of step S607, the time lag detection unit 5 completes the out-of-synchronization detection process illustrated in FIG. 13 and returns.

The process in step S608 is similar to that in step S405 illustrated in FIG. 9, and thus the description thereof is omitted. After completion of the process in step S608, the time lag detection unit 5 completes the out-of-synchronization detection processing illustrated in FIG. 13 and returns.

As described above, in the second exemplary embodiment, the time information table and the sound signal are transmitted with a delay, thereby enabling each processing module to recognize the accurate time of the sample that is being processed, even in the case where the delay process is performed after the time stretching process. Consequently, the out-of-synchronization between the video image and the sound can be accurately detected. Further, in the second exemplary embodiment, the out-of-synchronization can be accurately corrected by using the combination of the time stretching process and the delay process, even if there is large time lag between the video image and the sound.

OTHER EMBODIMENTS

In each of the above-described exemplary embodiments, an element is added for each frame in the time information table, but instead a plurality of frames may be collected into one element if the playback speed is not changed.

In each of the above-described exemplary embodiments, the sample length is included as an element in the time information table. However, the sample length may be omitted and may be calculated using a time difference from a subsequent element and a playback speed. The amount of data to be transmitted between processes can thereby be reduced.

While the above-described exemplary embodiments illustrate a system in which the time of a sound signal and the time of a video image to be played back are acquired and the video image and sound are played back in a synchronized manner, the present disclosure can also be applied to a system in which data or an event other than a video image and sound are played back in a synchronized manner.

In addition, the present disclosure can be implemented in other modes without departing from the scope of the present disclosure.

The above-described exemplary embodiments merely illustrate embodiment examples for carrying out the present disclosure, and the technical scope of the present disclosure should not be limitedly interpreted.

In other words, the present disclosure can be implemented in various forms without departing from the technical idea or principal features of the present disclosure.

According to the present disclosure, it is possible to suppress deterioration in the accuracy of synchronization between a video image and sound due to fluctuations in playback speed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-187987, filed Nov. 11, 2020, which is hereby incorporated by reference herein in its entirety.

What is claimed is:

1. A sound processing apparatus comprising:
   at least one processor; and
   a memory coupled to the at least one processor, the memory having instructions that are executed by the processor and the processor functions as hardware units and performs the following:
   a reception unit configured to receive information including a timecode of video data;
   an acquisition unit configured to acquire, from a storage unit configured to store a sound signal at time corresponding to the timecode, sample data obtained from the sound signal, and to generate a time information table including a playback speed of the sound signal;
   a time stretching unit configured to generate a time stretched signal by time stretching the sampled data using the playback speed corrected by a time lag;
   an output unit configured to generate an output signal from the time stretched signal using the time information table; and
   a detection unit configured to detect the time lag using the timecode and a playback time of the output signal,
   wherein the time stretching unit corrects the playback speed by a preset ratio in the time lag.

2. The sound processing apparatus according to claim 1, wherein the acquisition unit acquires the sample data with header time corresponding to the timecode.

3. The sound processing apparatus according to claim 1, wherein the output unit generates the output signal by associating the playback speed with header time of the sample data.

4. The sound processing apparatus according to claim 1, wherein the output unit generates the output signal by associating the playback speed, the sample data, and a sample length of the sample data with each other.

5. The sound processing apparatus according to claim 1, wherein the time stretching unit is further configured to execute a low-pass filter process on the sampled data.

6. The sound processing apparatus according to claim 1, wherein the output signal from the output unit is further associated with information indicating whether a time stretching process has been performed.

7. The sound processing apparatus according to claim 1, further comprising a delay unit configured to delay an output of the sound signal.

8. The sound processing apparatus according to claim 7, wherein the delay unit outputs the delayed sound signal and time information newly generated to match the delayed sound signal.

9. A sound processing method comprising:
   receiving information including a timecode of video data;
   acquiring, from a storage unit configured to store a sound signal at time corresponding to the timecode and sample data obtained from the sound signal;
   generating a time information table including a playback speed of the sound signal;
   generating a time stretched signal by time stretching the sampled data using the playback speed corrected by a time lag;
   generating an output signal from the time stretched signal using the time information table; and
   detecting the time lag using the timecode and a playback time of the output signal,
   wherein generating a time stretched signal corrects the playback speed by a preset ratio in the time lag.

10. A non-transitory computer readable storage medium storing a program for causing a computer to execute a sound processing method, the method comprising:
    receiving information including a timecode of video data;
    acquiring, from a storage unit configured to store a sound signal at time corresponding to the timecode and sample data obtained from the sound signal;
    generating a time information table including a playback speed of the sound signal;
    generating a time stretched signal by time stretching the sampled data using the playback speed corrected by a time lag;
    generating an output signal from the time stretched signal using the time information table; and
    detecting the time lag using the timecode and a playback time of the output signal,
    wherein generating a time stretched signal corrects the playback speed by a preset ratio in the time lag.

11. The sound processing apparatus according to claim 1, wherein the time information table further includes a sample time and a sample length.

* * * * *